(12) United States Patent
Xiao et al.

(10) Patent No.: US 11,912,623 B2
(45) Date of Patent: Feb. 27, 2024

(54) FLUIDIZED SOLIDIFIED SOIL BASED ON GOLD TAILINGS, AND PREPARATION METHOD THEREOF

(71) Applicants: WUHAN INSTITUTE OF TECHNOLOGY, Wuhan (CN); The College of Post and Telecommunication of WIT, Wuhan (CN)

(72) Inventors: Zunqun Xiao, Wuhan (CN); Caiyun Xu, Wuhan (CN); Fuqi Wang, Wuhan (CN); Jian Lin, Wuhan (CN); Hui Wang, Wuhan (CN); Zhentao Lv, Wuhan (CN); Yanbin Chang, Wuhan (CN); Haitao Liu, Wuhan (CN); Yinlei Shi, Wuhan (CN); Keqi Luo, Wuhan (CN); Minghui Deng, Wuhan (CN); Puyu Li, Wuhan (CN); Yuepeng Zheng, Wuhan (CN)

(73) Assignees: WUHAN INSTITUTE OF TECHNOLOGY, Wuhan (CN); The College of Post and Telecommunication of WIT, Wuhan (CN)

( * ) Notice: Subject to any disclaimer, the term of this patent is extended or adjusted under 35 U.S.C. 154(b) by 0 days.

(21) Appl. No.: 18/316,255

(22) Filed: May 12, 2023

(65) Prior Publication Data
US 2023/0382795 A1  Nov. 30, 2023

(30) Foreign Application Priority Data

May 25, 2022 (CN) .......................... 202210578991.6

(51) Int. Cl.
| | |
|---|---|
| C04B 18/12 | (2006.01) |
| C04B 28/14 | (2006.01) |
| C04B 22/16 | (2006.01) |
| C04B 22/06 | (2006.01) |
| C04B 24/26 | (2006.01) |
| C04B 40/00 | (2006.01) |
| C04B 22/10 | (2006.01) |
| C04B 103/40 | (2006.01) |
| C04B 103/30 | (2006.01) |

(52) U.S. Cl.
CPC ............ *C04B 18/12* (2013.01); *C04B 22/062* (2013.01); *C04B 22/106* (2013.01); *C04B 22/16* (2013.01); *C04B 24/2641* (2013.01); *C04B 24/2652* (2013.01); *C04B 28/14* (2013.01); *C04B 40/0039* (2013.01); *C04B 2103/302* (2013.01); *C04B 2103/408* (2013.01)

(58) Field of Classification Search
CPC ..... C04B 18/12; C04B 22/062; C04B 22/106; C04B 22/16; C04B 24/2641; C04B 24/2652; C04B 28/14; C04B 40/0039; C04B 2103/302; C04B 2103/408
USPC .............................................................. 524/2
See application file for complete search history.

(56) References Cited

U.S. PATENT DOCUMENTS

| | | |
|---|---|---|
| 3,836,200 A | 9/1974 | Booth |
| 4,688,588 A | 8/1987 | Horsley et al. |
| 5,636,942 A | 6/1997 | Brackebusch |

FOREIGN PATENT DOCUMENTS

CN          109095892 A  *  12/2018

OTHER PUBLICATIONS

Abstract of CN 109095892, Dec. 28, 2018. (Year: 2018).*

* cited by examiner

*Primary Examiner* — Hui H Chin
(74) *Attorney, Agent, or Firm* — True Shepherd LLC; Andrew C. Cheng

(57) ABSTRACT

A fluidized solidified soil based on gold tailings includes the following raw materials in parts by mass: 75 parts to 80 parts of gold tailings, 5.2 parts to 13 parts of a dispersant solution, and 9 parts to 16 parts of a solidifying material. A preparation method includes the following steps: mixing the gold tailings with the dispersant solution, and then stirring to obtain a suspension slurry of the gold tailings; and adding the solidifying material, and stirring to obtain the fluidized solidified soil. In the present disclosure, the gold tailings are used as a main material, combined with a special dispersant solution and a special solidifying material, and a fluidized solidified soil is prepared with fluidity suitable for pumping and a certain strength after hardening. The fluidized solidified soil prevents the pollution caused by gold tailings landfilling, and can be used as a filling material for various construction projects.

6 Claims, 1 Drawing Sheet

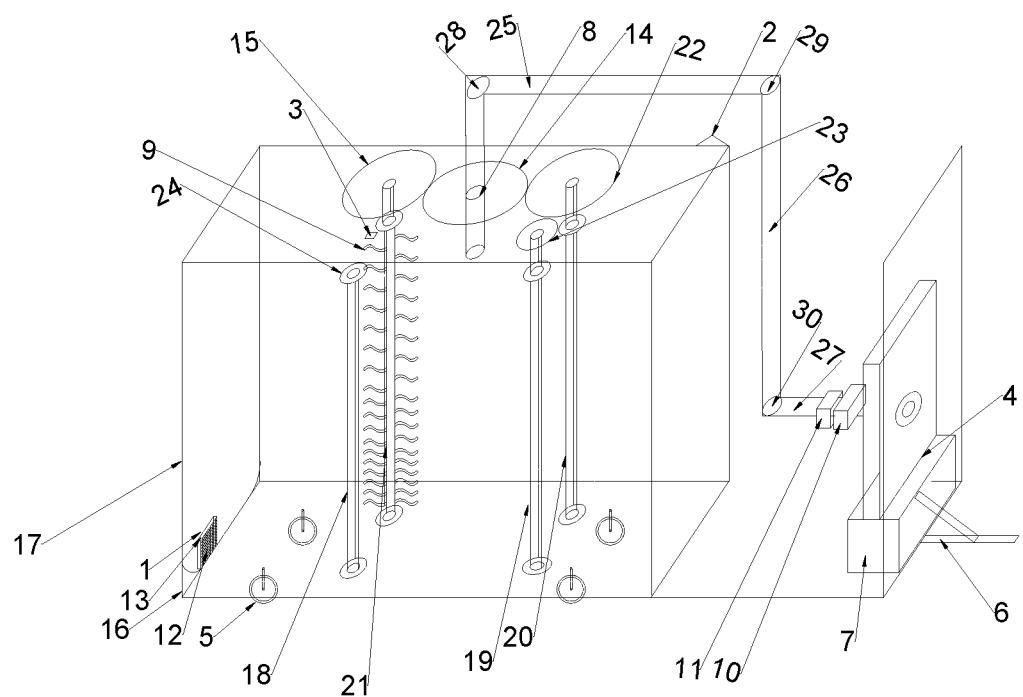

FLUIDIZED SOLIDIFIED SOIL BASED ON GOLD TAILINGS, AND PREPARATION METHOD THEREOF

CROSS-REFERENCE TO RELATED APPLICATIONS

This application claims priority to Chinese Patent Application No. 202210578991.6 with a filing date of May 25, 2022. The content of the aforementioned application, including any intervening amendments thereto, is incorporated herein by reference.

TECHNICAL FIELD

The present disclosure belongs to the technical field of civil engineering materials, and in particular relates to a fluidized solidified soil based on gold tailings, and a preparation method thereof.

BACKGROUND

Years of mine development have resulted in a large amount of tailings. The tailings not only occupy cultivated land, pollute the environment, and destroy vegetation, but also easily cause natural disasters such as subsidence, landslides, and mud-rock flows. Gold tailings are solid wastes discharged from gold-bearing ores after crushing, grinding, and sorting. However, from the perspective of resources and environmental science, the gold tailings can also be recycled to be a potential secondary resource. At present, with the vigorous promotion of various types of engineering construction, there is a large market demand for filling materials that meet certain mechanical properties. For example, there are relatively large material gaps in backfilling foundation pits, foundation trench backfilling for road widening projects, and backfilling for underground pipe gallery construction. The preparation of these filling materials from the gold tailings can not only solve the environmental and safety problems caused by the stockpiling of tailings, but also turn waste into wealth to create economic values.

Chinese patent CN113955997A disclosed a concrete containing copper tailings and a preparation method thereof. In this method, the copper tailings sand is used instead of natural sand to prepare concrete, and a fineness modulus of the copper tailings sand is required to be 0.4. Chinese patent CN215444136U disclosed a full tailings cemented filling device for comprehensive utilization of tailings. Through this device, the tailings are made into a full tailings cemented filling material. During the operation of this device, the tailings need to be filtered; otherwise the processing level and filling effect may be affected. For the above utilization of tailings, whether it is used for concrete or cement mortar filling materials, there is a high requirement on the particle size of tailings. These technologies require particle size screening of tailings, to select a particle size that meets the requirements of natural sand. However, gold tailings particles are mainly clay particles, which have poor fluidity in the natural state, making it difficult to conduct the particle size screening. This can reduce a utilization rate of the tailings and increase a cost of the utilization. Therefore, the appropriate application of gold tailings in filling materials is still a difficult problem to be solved at present.

SUMMARY OF PRESENT INVENTION

In order to realize use of gold tailings in filling materials, the present disclosure aims to provide a fluidized solidified soil based on gold tailings, and a preparation method thereof. In the present disclosure, the gold tailings are used as a main material, which is mixed with a special dispersant solution and a special solidifying material, and then stirred to form a fluidized solidified soil. The fluidized solidified soil solves the pollution caused by gold tailings landfilling, and can be used as a filling material to realize resource reuse.

To achieve the above objective, the present disclosure provides a fluidized solidified soil based on gold tailings, including the following raw materials in parts by mass: 75 parts to 80 parts of gold tailings, 5.2 parts to 13 parts of a dispersant solution, and 9 parts to 16 parts of a solidifying material.

In the present disclosure, the gold tailings include the following chemical components by mass: $SiO_2$: 66% to 76%, $Al_2O_3$: 10% to 16%, $K_2O$: 6% to 10%, $Fe_2O_3$: 1% to 3%, $Na_2O$: 1% to 2%, CaO: 0.12% to 1%, and $TiO_2$: 0.1% to 0.3%.

In the present disclosure, the gold tailings have a particle size of less than or equal to 1 cm.

In the present disclosure, the dispersant solution is prepared by dissolving a dispersant in water and then regulating a pH value; the dispersant is compounded by the following raw materials: sodium hexametaphosphate, sodium tripolyphosphate, polyacrylamide, and polycarboxylic acid; and a pH regulator is a mixture of sodium hydroxide and sodium bicarbonate.

In the present disclosure, the dispersant includes the following raw materials in mass percentage: 45% to 60% of sodium hexametaphosphate, 15% to 30% of sodium tripolyphosphate, 5% to 15% of polyacrylamide, and 5% to 10% of polycarboxylic acid.

In the present disclosure, the dispersant solution has a mass concentration of 3% to 8% and a pH value of 7.1 to 8.0.

In the present disclosure, the solidifying material is compounded by a mixture A of cement, blast furnace slag, fly ash, and a water reducer, and gypsum.

In the present disclosure, the mixture A includes the following raw materials in mass percentage: 50% to 60% of the cement, 30% to 40% of S95 granulated blast furnace slag, 5% to 10% of the fly ash, and 1% to 2% of the water reducer; and the gypsum has a mass of 4% to 6% of a total mass of the cement and the S95 granulated blast furnace slag in the mixture A.

The present disclosure further provides a preparation method of the fluidized solidified soil based on gold tailings, including the following steps:

(1) mixing the raw materials of the dispersant uniformly to obtain the dispersant, and dissolving the dispersant in the water to obtain the dispersant solution;

(2) mixing the gold tailings with the dispersant solution, and stirring evenly to obtain a suspension slurry of the gold tailings;

(3) mixing the raw materials of the solidifying material uniformly to obtain the solidifying material; and (4) adding the solidifying material into the suspension slurry of the gold tailings, and stirring evenly to obtain the fluidized solidified soil.

In the present disclosure, the dispersant has a mass of 0.3% to 1.2% of that of the gold tailings.

In the present disclosure, the stirring in step (2) is conducted at 50 r/min to 80 r/min for 10 min to 20 min.

In the present disclosure, the solidifying material is used at 12% to 20% of a mass of the gold tailings.

In the present disclosure, a mass ratio of water and the solidifying material is (0.6-0.7): 1.

In the present disclosure, the stirring in step (4) is conducted at 60 r/min to 120 r/min for 10 min to 30 min.

Compared with the prior art, the present disclosure has the following beneficial effects:

(1) In the present disclosure, the gold tailings are used as a main material. Aiming at the natural properties of gold tailings particles mainly consisting of clay particles, a special dispersant and a special solidifying material are developed to prepare a fluidized solidified soil. The fluidized stabilized soil can improve the utilization rate of gold tailings, reduce the landfill land occupation, and improve the environment, and can be widely used in backfilling and pouring of various foundation pits and mine pits, as well as reinforcement of road subgrades and building foundations. Therefore, the fluidized solidified soil shows desirable economic and environmental benefits.

(2) In the present disclosure, the fluidized solidified soil has fluidity suitable for pumping, and is convenient for transportation and construction. Moreover, the fluidized solidified soil has a certain strength after hardening, and an unconfined compressive strength after 28 d of curing under standard conditions is not less than MPa. This shows that the fluidized solidified soil meets the construction requirements of general filling projects and is an extremely desirable construction material.

(3) In the present disclosure, the preparation method has a simple process and does not have high requirements on a particle size of the tailings, and only needs to remove broken rocks with a particle size of greater than 1 cm. Since gold tailings generally do not have large coarse particles, there is no need for pretreatment such as grinding and sieving. This simplifies the manufacturing process and reduces costs.

BRIEF DESCRIPTION OF THE DRAWINGS

FIG. 1 shows a structural schematic diagram of a stirring device used in examples of the present disclosure.

Reference numerals: 1: Material outlet, 2: Material inlet, 3: Limit alarm, 4: Motor, 5: Wheel, 6: Drawbar, 7: Auxiliary box, 8: Auxiliary drive shaft A, 9: Impeller, Reducer, 11: Coupling, 12: Wire gauze, 13: Material outlet baffle, 14: Small gear, Large gear A, 16: Material box bracket, 17: Material box, 18: Transmission shaft C, 19: Transmission shaft D, 20: Transmission shaft B, 21: Transmission shaft A, 22: Large gear C, 23: Large gear B, 24: Large gear D, 25: Auxiliary transmission shaft B, 26: Auxiliary transmission shaft C, 27: Auxiliary transmission shaft D, 28: Bevel gear A, 29: Bevel gear B, and 30: Bevel gear C.

DETAILED DESCRIPTION OF THE EMBODIMENTS

In order to better understand the present disclosure, content of the present disclosure is further illustrated below with reference to examples. However, the content of the present disclosure is not limited to the following examples.

In the following examples, the gold tailings include the following chemical components by mass: $SiO_2$: 73%, $Al_2O_3$: 15%, $K_2O$: 7%, $Fe_2O_3$: 2%, $Na_2O$: 1%, CaO: and $TiO_2$: 0.2%, and have a particle size of less than or equal to 1 cm.

In the following examples, a four-axis vertical multidirectional stirring device is adopted, and its structural schematic diagram is shown in FIG. 1. The device has four transmission shafts, and a stirring speed and stirring direction of each rotating shaft can be changed arbitrarily during the stirring. The impellers on the transmission shaft are arranged from top to bottom, and the denser the impellers go down, the materials can be stirred and mixed more fully. In this way, a fluidized solidified soil is formed with desirable integrity and high bearing capacity. During the implementation, the gold tailings and the dispersant solution enter the stirring device from a material inlet 2. After the device is started, an impeller 9 starts to rotate, a reducer 10 can control a rotating speed of the impeller 9, and a coupling 11 can control a rotating direction of the impeller 9, such that the materials are mixed evenly. The solidifying material also enters the stirring device from the material inlet 2; and after the stirring is completed, the fluidized solidified soil is discharged from a material outlet 1.

In the following examples, a slump is determined to reflect the fluidity and groutability of the fluidized solidified soil. A determination method includes: the fluidized solidified soil is poured into a trumpet-shaped slump barrel with an upper opening of 100 mm, a lower opening of 200 mm, and a height of 300 mm. After tamping, the soil is leveled and the barrels are pulled up. The fluidized solidified soil slumps due to its own weight, and a height of the highest point of the fluidized solidified soil after the collapse is subtracted from a bucket height to obtain the slump. In the following examples, an unconfined compressive strength is determined to represent a solidification strength of the fluidized solidified soil. A determination method includes: a cube test mold with a size of 70.5 mm×70.5 mm×70.5 mm was poured using the fluidized solidified soil, and demolding was conducted after 48 h. An obtained specimen was placed in a standard curing room at 20° C.±2° C. and a relative humidity of greater than 95% for 7 d, 14 d, 28 d, and 60 d, and the compressive strength of the specimen was determined using an unconfined uniaxial press.

Example 1

A method for preparing a fluidized solidified soil based on gold tailings included the following steps:

(1) 50% of sodium hexametaphosphate, 30% of sodium tripolyphosphate, 10% of polyacrylamide, and 10% of polycarboxylic acid were uniformly mixed to obtain a dispersant; the dispersant was separately dissolved in water to obtain dispersant solutions with mass concentrations of 4%, 6%, and 8%, and pH values of the dispersant solutions were regulated with sodium hydroxide and sodium bicarbonate to 7.7, 7.8, and 7.9, respectively;

(2) 12 groups of gold tailings were added to the dispersant solution according to the ratios in Table 1, and then mixed in a stirring device by stirring at 50 r/min for min to obtain 12 groups of a suspension slurry of the gold tailings;

(3) 58% of ordinary Portland cement, 30% of S95 granulated blast furnace slag, 10% of fly ash, 2% of a water reducer, and gypsum at 6% of a total mass of the cement and the S95 granulated blast furnace slag, were mixed uniformly to obtain a solidifying material; and (4) according to Table 1, the solidifying material was separately added into 12 groups of the suspension slurry of the gold tailings, and stirred at 70 r/min for 30 min to obtain 12 groups of fluidized solidified soil.

TABLE 1

12 groups of gold tailings added to dispersant solution

| Group | Dispersant concentration | Solidifying material dosage | Gold tailings (part) | Dispersant solution (part) | Solidifying material (part) | Dispersant: gold tailings | Water: solidifying material |
|---|---|---|---|---|---|---|---|
| 1 | 4% | 12% | 80 | 7.00 | 9.60 | 0.35% | 0.70 |
| 2 | 4% | 15% | 78 | 7.80 | 11.70 | 0.40% | 0.64 |
| 3 | 4% | 18% | 77 | 8.66 | 13.86 | 0.45% | 0.60 |
| 4 | 4% | 20% | 75 | 9.38 | 15.00 | 0.50% | 0.60 |
| 5 | 6% | 12% | 80 | 6.67 | 9.60 | 0.50% | 0.65 |
| 6 | 6% | 15% | 78 | 7.80 | 11.70 | 0.60% | 0.63 |
| 7 | 6% | 18% | 77 | 8.86 | 13.86 | 0.69% | 0.60 |
| 8 | 6% | 20% | 75 | 9.63 | 15.00 | 0.77% | 0.60 |
| 9 | 8% | 12% | 80 | 7.00 | 9.60 | 0.70% | 0.67 |
| 10 | 8% | 15% | 78 | 7.70 | 11.70 | 0.79% | 0.61 |
| 11 | 8% | 18% | 77 | 9.24 | 13.86 | 0.96% | 0.61 |
| 12 | 8% | 20% | 75 | 11.25 | 15.00 | 1.20% | 0.69 |

The slump and unconfined compressive strengths of 7 d, 14 d, 28 d, and 60 d of the above 12 groups of fluidized solidified soils were tested, and the results were shown in Table 2. A slump of greater than 20 cm indicated that the fluidized solidified soil had desirable fluidity and groutability. The 28-d unconfined compressive strength was greater than 0.8 MPa, indicating that the fluidized solidified soil could be used in foundation reinforcement projects such as cement-soil mixing piles.

TABLE 2

Test Results

| Group | Slump (mm) | 7-d unconfined compressive strength (MPa) | 14-d unconfined compressive strength (MPa) | 28-d unconfined compressive strength (MPa) | 60-d unconfined compressive strength (MPa) |
|---|---|---|---|---|---|
| 1 | 350 | 0.31 | 0.40 | 0.82 | 1.60 |
| 2 | 355 | 0.33 | 0.43 | 0.84 | 1.64 |
| 3 | 361 | 0.37 | 0.46 | 0.89 | 1.69 |
| 4 | 356 | 0.36 | 0.45 | 0.84 | 1.65 |
| 5 | 355 | 0.35 | 0.42 | 0.85 | 1.64 |
| 6 | 362 | 0.37 | 0.45 | 0.88 | 1.67 |
| 7 | 367 | 0.41 | 0.48 | 0.92 | 1.70 |
| 8 | 359 | 0.41 | 0.47 | 0.89 | 1.69 |
| 9 | 353 | 0.33 | 0.42 | 0.84 | 1.63 |
| 10 | 360 | 0.35 | 0.44 | 0.88 | 1.65 |
| 11 | 365 | 0.39 | 0.48 | 0.91 | 1.66 |
| 12 | 357 | 0.40 | 0.46 | 0.87 | 1.66 |

Example 2

A method for preparing a fluidized solidified soil based on gold tailings included the following steps:

(1) 60% of sodium hexametaphosphate, 15% of sodium tripolyphosphate, 15% of polyacrylamide, and 10% of polycarboxylic acid were uniformly mixed to obtain a dispersant; the dispersant was separately dissolved in water to obtain dispersant solutions with mass concentrations of 4%, 6%, and 8%, and pH values of the dispersant solutions were regulated with sodium hydroxide and sodium bicarbonate to 7.2, 7.3, and 7.4, respectively;

(2) 12 groups of gold tailings were added to the dispersant solution according to the ratios in Table 3, and then mixed in a stirring device by stirring at 65 r/min for 15 min to obtain 12 groups of a suspension slurry of the gold tailings;

(3) 60% of ordinary Portland cement, 33% of S95 granulated blast furnace slag, 5% of fly ash, 2% of a water reducer, and gypsum at 5% of a total mass of the cement and the S95 granulated blast furnace slag, were mixed uniformly to obtain a solidifying material; and (4) according to Table 3, the solidifying material was separately added into 12 groups of the suspension slurry of the gold tailings, and stirred at 90 r/min for 20 min to obtain 12 groups of fluidized solidified soil.

TABLE 3

12 groups of gold tailings added to dispersant solution

| Group | Dispersant concentration | Solidifying material dosage | Gold tailings (part) | Dispersant solution (part) | Solidifying material (part) | Dispersant: gold tailings | Water: solidifying material |
|---|---|---|---|---|---|---|---|
| 1 | 4% | 12% | 80 | 6.40 | 9.60 | 0.32% | 0.64 |
| 2 | 4% | 15% | 78 | 7.61 | 11.70 | 0.39% | 0.62 |

TABLE 3-continued 12 groups of gold tailings added to dispersant solution

| Group | Dispersant concentration | Solidifying material dosage | Gold tailings (part) | Dispersant solution (part) | Solidifying material (part) | Dispersant: gold tailings | Water: solidifying material |
|---|---|---|---|---|---|---|---|
| 3 | 4% | 18% | 77 | 8.66 | 13.86 | 0.45% | 0.60 |
| 4 | 4% | 20% | 75 | 9.38 | 15.00 | 0.50% | 0.60 |
| 5 | 6% | 12% | 80 | 6.93 | 9.60 | 0.52% | 0.68 |
| 6 | 6% | 15% | 78 | 7.80 | 11.70 | 0.60% | 0.63 |
| 7 | 6% | 18% | 77 | 8.86 | 13.86 | 0.69% | 0.60 |
| 8 | 6% | 20% | 75 | 9.75 | 15.00 | 0.78% | 0.61 |
| 9 | 8% | 12% | 80 | 7.30 | 9.60 | 0.73% | 0.70 |
| 10 | 8% | 15% | 78 | 7.70 | 11.70 | 0.79% | 0.61 |
| 11 | 8% | 18% | 77 | 9.14 | 13.86 | 0.95% | 0.61 |
| 12 | 8% | 20% | 75 | 10.31 | 15.00 | 1.10% | 0.63 |

The slump and unconfined compressive strengths of 7 d, 14 d, 28 d, and 60 d of the above 12 groups of fluidized solidified soils were tested, and the results were shown in Table 4. A slump of greater than 20 cm indicated that the fluidized solidified soil had desirable fluidity and groutability. The 28-d unconfined compressive strength was greater than 0.8 MPa, indicating that the fluidized solidified soil could be used in foundation reinforcement projects such as cement-soil mixing piles.

TABLE 4

Test Results

| Group | Slump (mm) | 7-d unconfined compressive strength (MPa) | 14-d unconfined compressive strength (MPa) | 28-d unconfined compressive strength (MPa) | 60-d unconfined compressive strength (MPa) |
|---|---|---|---|---|---|
| 1 | 372 | 0.35 | 0.48 | 0.86 | 1.65 |
| 2 | 377 | 0.38 | 0.50 | 0.89 | 1.68 |
| 3 | 382 | 0.39 | 0.55 | 0.97 | 1.72 |
| 4 | 377 | 0.39 | 0.52 | 0.88 | 1.70 |
| 5 | 378 | 0.38 | 0.52 | 0.88 | 1.68 |
| 6 | 385 | 0.40 | 0.55 | 0.93 | 1.69 |
| 7 | 389 | 0.43 | 0.58 | 0.96 | 1.72 |
| 8 | 386 | 0.43 | 0.58 | 0.89 | 1.71 |
| 9 | 375 | 0.37 | 0.50 | 0.86 | 1.66 |
| 10 | 382 | 0.40 | 0.53 | 0.90 | 1.68 |
| 11 | 385 | 0.42 | 0.56 | 0.96 | 1.71 |
| 12 | 382 | 0.41 | 0.56 | 0.89 | 1.70 |

Example 3

A method for preparing a fluidized solidified soil based on gold tailings included the following steps:

(1) 55% of sodium hexametaphosphate, 25% of sodium tripolyphosphate, 15% of polyacrylamide, and 5% of polycarboxylic acid were uniformly mixed to obtain a dispersant; the dispersant was separately dissolved in water to obtain dispersant solutions with mass concentrations of 4%, 6%, and 8%, and pH values of the dispersant solutions were regulated with sodium hydroxide and sodium bicarbonate to 7.5, 7.6, and 7.7, respectively;

(2) 12 groups of gold tailings were added to the dispersant solution according to the ratios in Table 5, and then mixed in a stirring device by stirring at 80 r/min for min to obtain 12 groups of a suspension slurry of the gold tailings;

(3) 50% of ordinary Portland cement, 40% of S95 granulated blast furnace slag, 8% of fly ash, 2% of a water reducer, and gypsum at 4% of a total mass of the cement and the S95 granulated blast furnace slag, were mixed uniformly to obtain a solidifying material; and (4) according to Table 5, the solidifying material was separately added into 12 groups of the suspension slurry of the gold tailings, and stirred at 110 r/min for 10 min to obtain 12 groups of fluidized solidified soil.

TABLE 5

12 groups of gold tailings added to dispersant solution

| Group | Dispersant concentration | Solidifying material dosage | Gold tailings (part) | Dispersant solution (part) | Solidifying material (part) | Dispersant: gold tailings | Water: solidifying material |
|---|---|---|---|---|---|---|---|
| 1 | 4% | 12% | 80 | 6.60 | 9.60 | 0.33% | 0.66 |
| 2 | 4% | 15% | 78 | 7.61 | 11.70 | 0.39% | 0.62 |
| 3 | 4% | 18% | 77 | 8.66 | 13.86 | 0.45% | 0.60 |
| 4 | 4% | 20% | 75 | 9.75 | 15.00 | 0.52% | 0.62 |

TABLE 5-continued 12 groups of gold tailings added to dispersant solution

| Group | Dispersant concentration | Solidifying material dosage | Gold tailings (part) | Dispersant solution (part) | Solidifying material (part) | Dispersant: gold tailings | Water: solidifying material |
|---|---|---|---|---|---|---|---|
| 5 | 6% | 12% | 80 | 7.07 | 9.60 | 0.53% | 0.69 |
| 6 | 6% | 15% | 78 | 7.67 | 11.70 | 0.59% | 0.62 |
| 7 | 6% | 18% | 77 | 8.98 | 13.86 | 0.70% | 0.61 |
| 8 | 6% | 20% | 75 | 9.88 | 15.00 | 0.79% | 0.62 |
| 9 | 8% | 12% | 80 | 6.90 | 9.60 | 0.69% | 0.66 |
| 10 | 8% | 15% | 78 | 7.80 | 11.70 | 0.80% | 0.61 |
| 11 | 8% | 18% | 77 | 9.53 | 13.86 | 0.99% | 0.63 |
| 12 | 8% | 20% | 75 | 10.31 | 15.00 | 1.10% | 0.63 |

The slump and unconfined compressive strengths of 7 d, 14 d, 28 d, and 60 d of the above 12 groups of fluidized solidified soils were tested, and the results were shown in Table 6. A slump of greater than 20 cm indicated that the fluidized solidified soil had desirable fluidity and groutability. The 28-d unconfined compressive strength was greater than 0.8 MPa, indicating that the fluidized solidified soil could be used in foundation reinforcement projects such as cement-soil mixing piles.

TABLE 6

Test Results

| Group | Slump (mm) | 7-d unconfined compressive strength (MPa) | 14-d unconfined compressive strength (MPa) | 28-d unconfined compressive strength (MPa) | 60-d unconfined compressive strength (MPa) |
|---|---|---|---|---|---|
| 1 | 361 | 0.33 | 0.45 | 0.85 | 1.63 |
| 2 | 366 | 0.36 | 0.46 | 0.86 | 1.65 |
| 3 | 372 | 0.37 | 0.49 | 0.95 | 1.68 |
| 4 | 365 | 0.37 | 0.48 | 0.95 | 1.68 |
| 5 | 366 | 0.36 | 0.49 | 0.88 | 1.66 |
| 6 | 371 | 0.39 | 0.49 | 0.92 | 1.68 |
| 7 | 377 | 0.41 | 0.52 | 1.00 | 1.68 |
| 8 | 372 | 0.41 | 0.53 | 0.90 | 1.67 |
| 9 | 363 | 0.35 | 0.48 | 0.87 | 1.64 |
| 10 | 366 | 0.39 | 0.51 | 0.90 | 1.66 |
| 11 | 375 | 0.40 | 0.52 | 0.99 | 1.68 |
| 12 | 366 | 0.39 | 0.51 | 0.93 | 1.67 |

It is apparent that the above examples are merely listed for clear description, and are not intended to limit the implementations. Those of ordinary skill in the art can make other changes in different forms based on the above description. It is not possible to give an exhaustive list of all the examples here, and any apparent changes derived from the technical solution of the present disclosure are still within the protection scope of the present disclosure.

What is claimed is:

1. A fluidized solidified soil based on gold tailings, comprising the following raw materials in parts by mass: 75 parts to 80 parts of gold tailings, 5.2 parts to 13 parts of a dispersant solution, and 9 parts to 16 parts of a solidifying material; wherein the gold tailings comprise the following chemical components by mass: $SiO_2$: 66% to 76%, $Al_2O_3$: 10% to 16%, $K_2O$: 6% to 10%, $Fe_2O_3$: 1% to 3%, $Na_2O$: 1% to 2%, CaO: 0.12% to 1%, and $TiO_2$: 0.1% to 0.3%, and have a particle size of less than or equal to 1 cm;

the dispersant solution is prepared by dissolving a dispersant in water and then regulating a pH value; the dispersant is compounded by the following raw materials in mass percentage: 45% to 60% of sodium hexametaphosphate, 15% to 30% of sodium tripolyphosphate, 5% to 15% of polyacrylamide, and 5% to 10% of polycarboxylic acid; and a pH regulator, wherein the pH regulator is a mixture of sodium hydroxide and sodium bicarbonate; and the solidifying material is compounded by a mixture A of cement, blast furnace slag, fly ash, and a water reducer, and gypsum; the mixture A comprises the following raw materials in mass percentage: 50% to 60% of the cement, 30% to 40% of S95 granulated blast furnace slag, 5% to 10% of the fly ash, and 1% to 2% of the water reducer; and the gypsum, wherein the gypsum has a mass of 4% to 6% of a total mass of the cement and the S95 granulated blast furnace slag in the mixture A.

2. The fluidized solidified soil according to claim 1, wherein the dispersant solution has a mass concentration of 3% to 8% and the pH value of 7.1 to 8.0.

3. A method for preparing the fluidized solidified soil based on gold tailings according to claim 1, comprising the following steps:

(1) mixing the raw materials of the dispersant uniformly to obtain the dispersant, dissolving the dispersant in the water, and then regulating the pH value to obtain the dispersant solution;

(2) mixing the gold tailings with the dispersant solution, and stirring evenly to obtain a suspension slurry of the gold tailings;

(3) mixing the raw materials of the solidifying material uniformly to obtain the solidifying material; and (4) adding the solidifying material into the suspension slurry of the gold tailings, and stirring evenly to obtain the fluidized solidified soil.

4. The method according to claim 3, wherein the solidifying material is used at 12% to 20% of a mass of the gold tailings.

5. The method according to claim 3, wherein a mass ratio of the water to the solidifying material is (0.6-0.7):1.

6. The method according to claim 3, wherein the stirring in step (2) is conducted at 50 r/min to 80 r/min for 10 min to 20 min; and the stirring in step (4) is conducted at 60 r/min to 120 r/min for 10 min to 30 min.

* * * * *